May 8, 1956 W. D. CHILTON 2,744,601
FLEXIBLE CHUTE
Filed Feb. 28, 1955 2 Sheets-Sheet 1
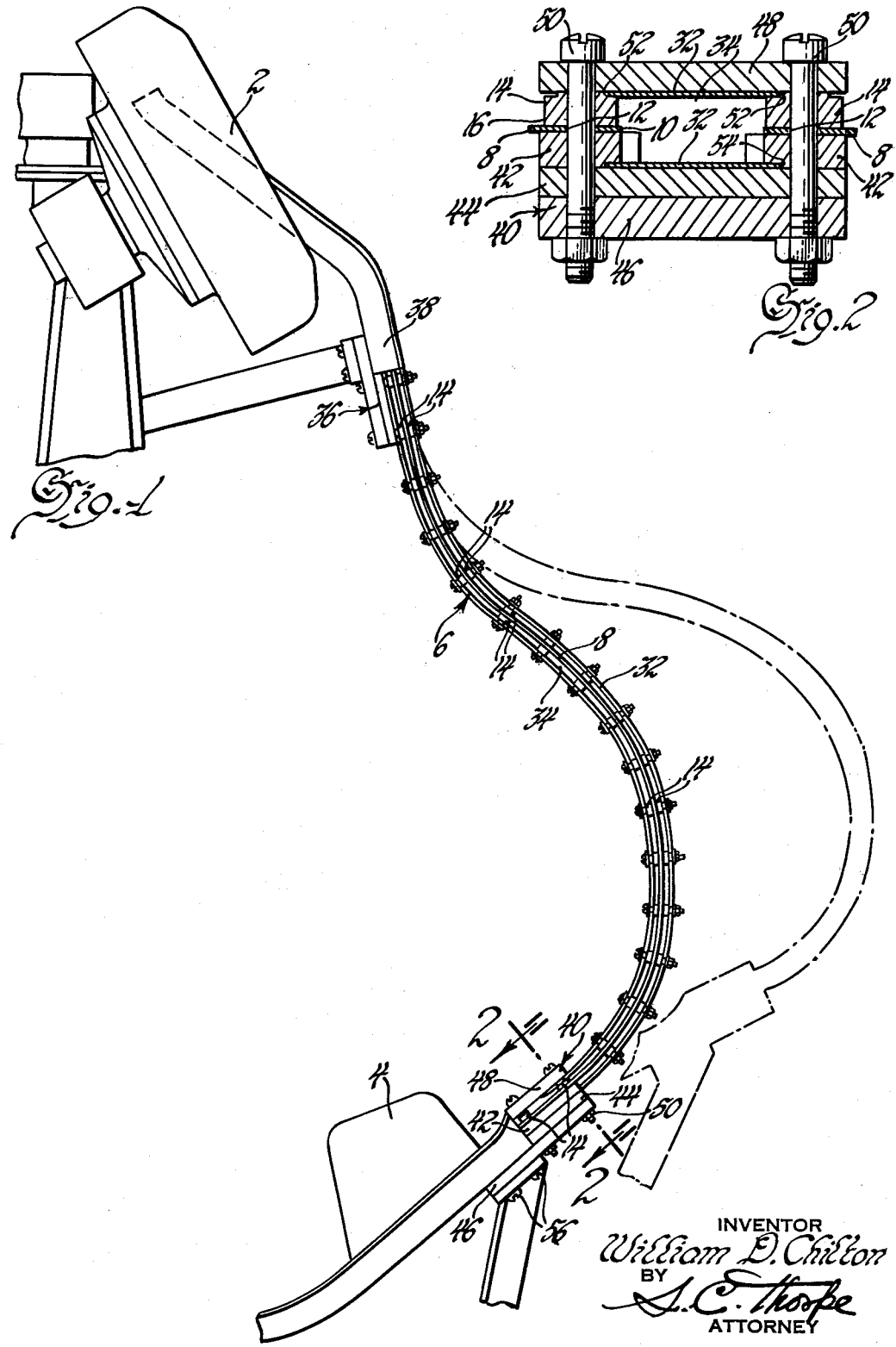
INVENTOR
William D. Chilton
BY
J. C. Thorpe
ATTORNEY

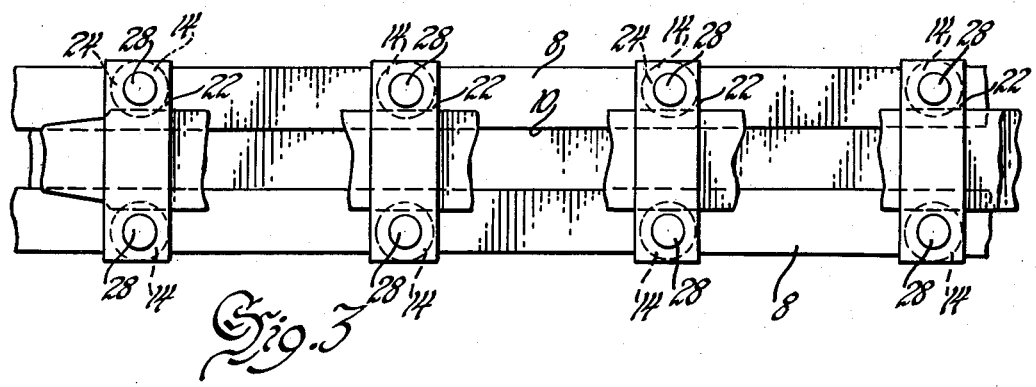
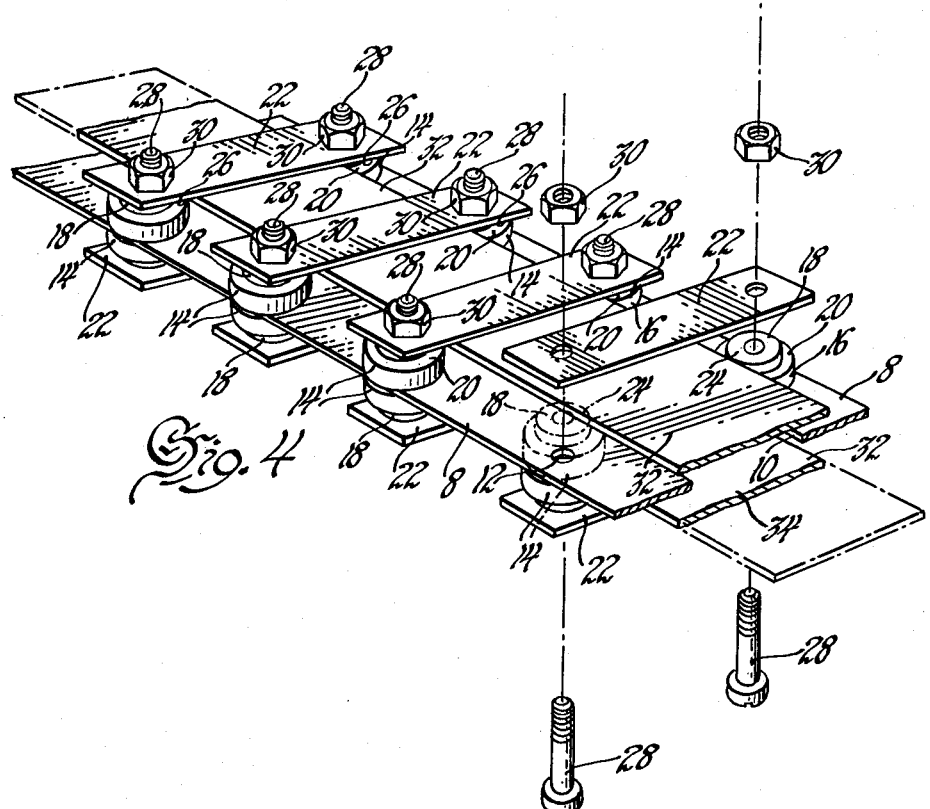

United States Patent Office 2,744,601
Patented May 8, 1956

2,744,601

FLEXIBLE CHUTE

William D. Chilton, Royal Oak, Mich., assignor to General Motors Corporation, Detroit, Mich., a corporation of Delaware Application February 28, 1955, Serial No. 490,997

6 Claims. (Cl. 193—25)

This invention relates generally to flexible runways or chutes and more particularly to flexible chutes of the type used to transport small machine parts, such as weld nuts, etc., between relatively movable dispensing and receiving stations, for example, from a stable hopper for weld nuts to the shuttle or loading device mounted on the moving platen of the nut welding machine.

Flexible conveyor chutes for the transporting or conducting of small machine parts, such as nuts, etc., have been used in the past. These flexible chutes, however, are normally closed and because of the closed construction do not have the required flexibility. The closed metallic construction is also objectionable because its closed construction does not permit easy access to the parts or pieces being transmitted therethrough in case jamming occurs. Furthermore, it is not readily adjustable for taking different size parts. These conduits are usally rolled from some sheet metal wtih the edges spun or bent over to form a channel along which the parts are conducted. The size of the channel usually approximates the size of the parts to be conducted so that they must pass along in series through the channel. This, of course, means that if a different size part is desired to be conducted it is necessary to design and construct a new channel for the new part. Non-metallic (compressible and stretchable) flexible conduits are similarly objectionable in that they are usually of a single unadjustable size and also are of closed construciton. They are additionally defective in that they do not have the relatively frictionless surfaces obtained with a metallic flexible conduit.

It is therefore an object of the present invention to provide a unique metallic conveyor chute having open construction and a maximum of flexibility.

It is another object of the invention to provide a unique metallic feed chute which is quickly adjustable to form passages having different effective widths without adding or removing any parts.

It is still another object of this invention to provide a flexible metallic conveyor or feed chute whose component parts are simple forms easy to make and assemble.

It is a further object of the invention to provide a flexible conveyor or feed chute for small parts, such as welded nuts, etc., which defines an open accessible passage so that in case of jamming the jam is easily found and corrected.

Further objects and advantages of this invention will appear in connection with the accompanying detailed description and drawings, in which:

Fig. 1 is a view in elevation showing the unique flexible feed chute extending between a stable hopper and the loading device on the moving platen of a welding machine.

Fig. 2 is a view in section taken on the line 2—2 of Fig. 1 illustrating the end construction of the chute and an adaptor for fastening the end of the chute to the loading device. Fig. 2 also illustrates how the upper and lower plates defining the passage reside in slots formed between upper and lower spacers and upper and lower plates of the adaptor so that they may slide longitudinally relative to the intermediate plates forming the guiding edges of the chute to thereby provide the chute with maximum flexibility.

Fig. 3 is a fragmentary view enlarged showing in plan the chute and how the various components are secured together so that the upper and lower plates may move longitudinally relative to the intermediate guide plates upon flexure of the chute.

Fig. 4 is a view in perspective showing the underside of the flexible chute with one of the connecting portions exploded to further illustrate how the lower and upper plates may move longitudinally relative to the intermediate plates on flexing of the chute. Fig. 4 also illustrates that the holes provided in the intermediate plates are located closer to one longitudinally extending edge than the other so that these plates may be turned over to increase or decrease the effective width of the passage formed in the flexible chute.

Referring now to the figures, a hopper indicated by a numeral 2 is shown which may contain a plurality of small parts to be transmitted to another location. These parts may be weld nuts or other small machine parts. Also shown is a shuttle or loading device 4 which is adapted to receive the small parts. Part 4, however, is a moving part and moves relative to the hopper 2. In other words, in order to transport or conduct small parts from the hopper 2 to the shuttle 4 it is necessary to provide some sort of flexible conduit especially since the relative movement of the hopper 2 and shuttle 4 is often quite sudden and of rather large magnitude. For this purpose there has been provided a unique flexible conveyor chute, which forms the subject of the invention and which in Fig. 1 is indicated generally by a numeral 6. This flexible chute comprises a pair of rectangular longitudinally extending elongated flexible ribbon-like plates 8 spaced side by side in the same general plane and having in this case a pair of facing edges 10. It will be appreciated that the plates 8 can be turned over so as to change the distance between the edges 10 in a way to be described in more detail later. Plates 8 are provided with suitable equally spaced holes 12 along their lengths over which are positioned on either side thereof sets of spacers 14. The spacers 14 are similar in configuration and each comprises a relatively large cylindrical portion 16 and a relatively small cylindrical portion 18 which together define a recess or shoulder indicated by a numeral 20. Each of the spacers 18 is provided with a central hole which is adapted to align with one of the holes 12 in the plates 8. Extending transversely across the oppositely disposed plates 8 are tie pieces or plates 22 which engage the outer ends 24 of the relatively small cylindrical portions 18 and form therewith slots or recesses 26. As observed from Fig. 4, pairs of tie pieces 22 and sets of spacers 14 are stacked on opposite sides of the plates 8 along their lengths and secured together by means of bolts 28 extending through the holes provided in the tie plates, spacers and the elongated plates 8 so that these members are all clamped together by means of nuts 30 threaded on the bolts 28. Residing in the slots or notches 26 formed by the tie plates 22 and the different diameter portions of the spacers 14 are a pair of oppositely disposed ribbon-like plates 32 in generally parallel spaced planes. The thickness of the plates 32 is somewhat less than the width of the slots 26 so that the plates 32 are free to move in these slots. With this arrangement a passage 34 is defined between the plates 32 and the edges 10 of plates 8 which will allow the parts to be transmitted by the conveyor chute to slide along either of the plates 32 and be guided by the edges 10. It will be noted that the construction is such that the passage formed by these plates is open. In case the parts should tend to jam, the jam can be easily located and then quickly corrected by merely inserting a suitable tool between the plates and spacers to start the parts moving again. As shown in Fig. 1, the preferred method for mounting the flexible chute is to secure one end thereof as shown so that all of the plates 8, 32 have their ends rigidly fastened by an adaptor 36 to the discharging portion 38 of the hopper, the lower end of the chute is provided with another adaptor 40 which allows the ends of both of the spaced plates 32 to slide or move longitudinally in the slots 26.

Details of the structure of adaptor 40, as shown in Fig. 2, include a pair of elongated spacing members 42 on the underside of the plates 8 and sets of spacers 14 on the upper sides of the plates 8, as viewed in the figure. Below the spacers 42 is an elongated plate 44 and another plate 46 below plate 44. An upper plate 48 is also provided. Spacers 14, members 42 and plates 44, 46, 48 are all secured together by bolt and nut assemblies 50. It will be noted that the spacers 14 form with the upper plate 48 slots 52 which enable the end of (in this case) the upper plate to move longitudinally relative to the adaptor. The members 42 are also provided with suitable recesses forming slots 54 which similarly allow the end of the lower plate 32 to move longitudinally relative to the adaptor. Since, as will be readily apparent in Fig. 1, plate 46 is considerably longer than the other plates of the adaptor it is easily secured to the shuttle or loading device 4 as by the studs 56.

During bending of the chute some sliding movement of the plates 32, will, of course, occur in all of the slots 26. It may now be appreciated that the resistance to bending of the chute is almost wholly determined by the resistance of the plates 8 and 32 whose thickness can be selected so as to give the degree of flexibility desired.

Another feature of the invention which should be mentioned in more detail is the location of the holes 12. As shown in Fig. 2, the holes 12 and the elongated longitudinally extending plates 8 are located closer to one edge than the other. By so locating these holes 8 and using the same tie plates 22 the plates 8 may be turned over so that they extend further into the passage 34 and thereby reduce its effective width. Either one or both of plates 8 might be turned over so that actually three different effective widths for passage 34 can be obtained.

From the foregoing it may now be appreciated that a flexible conveyor or feed chute has been provided which is extremely flexible, which can be quickly adjusted to accommodate different size parts to be conducted by the chute, which provides flat surfaces along which the parts may slide under the influence of gravity and which guides the parts by means of relatively thin edges so as to reduce the chance for jamming of the parts being conducted. The chute is of open construction to expedite locating and correcting jams of parts and is easily assembled from relatively simple parts which eliminate the need for extrusion dies, channel-forming machines, etc.

I claim:

1. A flexible conveyor chute comprising a pair of parallelly spaced elongated plates in the same general plane, a plurality of tie pieces extending across said plates on opposite sides thereof, a plurality of spacers disposed on opposite sides of said plates and spaced along their lengths and interposed between said plates and tie pieces, fastening means securing said spacers and tie pieces and plates together, said spacers having recessed portions forming with said tie plates slots spaced from said elongated plates, a second pair of spaced elongated plates slidingly residing in said slots and forming with the facing edges of the first pair of elongated plates an open conducting passage, said last pair of plates being longitudinally movable in said slots relative to said first pair of plates upon flexure of said conveyor chute.

2. A flexible conveyor chute comprising a pair of parallelly spaced elongated plates in the same general plane, a plurality of tie pieces extending across said plates on opposite sides thereof, a plurality of spacers disposed on opposite sides of said plates and spaced along their lengths and interposed between said plates and tie pieces, fastening means securing said spacers and tie pieces and plates together, said spacers having recessed portions forming with said tie plates slots spaced from said elongated plates, a second pair of spaced elongated plates slidingly residing in said slots and forming with the facing edges of the first pair of elongated plates an open conducting passage, said last pair of plates being longitudinally movable in said slots relative to said first pair of plates upon flexure of said conveyor chute, said fastening means including studs insertable through holes provided in said tie plates in said first pair of plates and said spacers, the holes in said first pair of plates being located closer to one edge thereof than the other whereby the width of said passage is adjustable.

3. A flexible conduit comprising a plurality of elongated flexible members spaced to form a conductive passage therebetween, spacers interposed between said members and together forming guide ways in which certain of said members are movably supported, and fastening means securing said spacers and members together whereby certain of said members can move longitudinally relative to other of said members.

4. A flexible chute comprising a pair of spaced elongated plate-like members, tie pieces extending between said members on opposite sides thereof, spacers disposed on opposite sides of said members and interposed between said members and tie pieces, fastening means securing said spacers and tie pieces and members together, said spacers forming guide ways with said tie pieces, a second pair of spaced members residing in said guide ways and forming with said first pair of members a conducting passage, said last pair of members being movable in said guide ways relative to said first pair of members.

5. A flexible conduit comprising a plurality of spaced plate-like members in generally parallel planes forming a conducting passage therebetween, spacers interposed between said members, tie pieces extending between certain of said members and forming with said spacers guide ways in which certain of said members are slidingly supported, and fastening means securing said tie pieces and said spacers and said members together whereby certain of said members can move in their planes relative to certain other of said members.

6. A flexible chute comprising a pair of spaced elongated plate-like flexible members, tie pieces extending between said members on opposite sides thereof, spacers disposed on opposite sides of said members and interposed between said members and tie pieces and forming guide ways with said tie pieces, fastening means securing said spacers and tie pieces and members together, a second pair of spaced members residing in said guide ways and forming with said first pair of members a conducting passage, said last pair of members being movable in said guide ways relative to said first pair of members upon flexure of said chute, fastening means securing one set of ends of each of said pairs of members together to prevent relative movement thereof, the opposite ends of said pairs of members being free to move relative to each other.

No references cited.